United States Patent Office

3,449,492
Patented June 10, 1969

3,449,492
WATER RECONSTITUTABLE KAOLIN-PECTIN POWDERS
Erik H. Jensen, Kalamazoo, Mich., assignor to The Upjohn Company, Kalamazoo, Mich., a corporation of Delaware
No Drawing. Continuation of application Ser. No. 285,874, June 6, 1963. This application Oct. 5, 1964, Ser. No. 401,641
Int. Cl. A61k 27/06
U.S. Cl. 424—154                            6 Claims

ABSTRACT OF THE DISCLOSURE

A method for preparing a dry powder mixture which readily reconstitutes with water to form a suspension consisting of preparing a suspension of kaolin, bentonite, pectin and an alkyl polyalcohol having 3 to 6 carbon atoms in water and then removing the water by a drying process.

---

This application is a continuation of application Ser. No. 285,874, filed June 6, 1963, now abandoned.

This invention relates to a dry powder mixture which can be readily reconstituted with water to provide an aqueous suspension for the treatment of diarrhea and a process for preparing the dry powder. More particularly the dry powder comprises a mixture of kaolin, bentonite, pectin and an alkyl polyalcohol having from 3 to 6 carbon atoms, inclusive, the process for preparing the powder comprising suspending the aforementioned materials in water and drying the aqueous suspension.

The use of aqueous suspensions of kaolin and pectin for treatment of diarrhea in humans and animals is well established and is represented by the Kaolin Mixture with Pectin of the National Formulary. Modifications of the N.F. formula have been provided by various manufacturers under various trademarks. These compositions, although adequate for the usual channels of commerce do have certain disadvantages. The compositions are for the most part made up of water which is bulky and increases cost of shipping, and occupies valuable space. Further, the aqueous suspensions are subject to freezing and deterioration over long periods of time.

To avoid these problems it has been proposed merely to supply the non-aqueous ingredients to be added to water to prepare the finished compositions. This expedient has, however, presented its own problems, namely, requiring manufacturing equipment and skill in reconstitution. If neither of the aforementioned is available, the powders do not mix with water to form a physically stable or palatable composition.

The present invention comprises a dry mixture of kaolin, bentonite, pectin and an alkyl polyalcohol having from 3 to 6 carbon atoms, inclusive, which has been prepared by dispersing the bentonite, pectin and alkyl polyalcohol in water and then drying and adding the kaolin. Alternatively, the bentonite and pectin can be individually dispersed in water, dividing the alkyl polyalcohol between the two dispersions, drying, and then mixing together with the kaolin. Advantageously, the powder mixture contains sweetening, flavoring and buffering agents and a preservative.

The kaolin used in the composition of the present invention is a hydrated aluminum silicate $H_2Al_2SiO_8 \cdot H_2O$. The kaolin minerals include kaolinite, dickite, anauxite, halloysite and endellite.

The bentonite is a natural colloidal hydrated aluminum silicate, $Al_2O_3 \cdot 4SiO_2 \cdot H_2O$, of the montmorillonite group of clays and includes montmorillonite, beidellite, nontronite, hectorite, saponite and sauconite.

Pectin is a polysaccharide most commonly obtained from citrus rinds.

The alkyl polyalcohol having from 3 to 6 carbon atoms is defined as an alkyl carbon chain of 3 to 6 atoms having hydrogen and up to 1 hydroxyl group attached to each carbon atom. Compounds included within the scope of the definition include, for example, glycerin and propylene glycol (3 carbon atoms), erythritol (4 carbon atoms), arabitol (5 carbon atoms) and sorbitol and mannitol (6 carbon atoms).

The following table indicates the range of relative proportions of the essential ingredients in the dry unreconstituted powder.

|  | Range w./w. (percent) | Preferred w./w. (percent) |
|---|---|---|
| Kaolin | 50–95 | 82 |
| Bentonite | 3–30 | 8 |
| Pectin | 0.1–10 | 2 |
| Alkyl polyalcohol | 2–20 | 8 |

The term "dry" is used in the pharmaceutical sense and refers to the gross appearance of the powder and not in the chemical sense which means the total absence of water. It is to be anticipated that some water will be present either as water of crystallization or adsorbed molecular films of water in certain instances.

In addition to the preceding ingredients which are necessary to the invention, additional adjuvants can be included to prepare a more elegant and therefore preferable product. Such adjuvants include, for example, sweetening agents, flavors, and preservatives. Aside from the sweetening due to the alkyl polyalcohols, it is advantageous to use an artificial sweetener such as sodium saccharin and sodium cyclamate at a concentration of up to about 0.5%. Flavoring agents that can be used include oil of lime, orange, lemon, wintergreen, peppermint and spearmint as well as other natural and artificial flavors. Flavoring agents can be used singly or in combination at a concentration of up to about 5%. Preservatives can be included to prevent bacterial growth, for example, methylparaben and propylparaben.

It is advantageous that, after the powder is reconstituted with water, the aqueous suspension have a pH between 3 and 7, preferably about 5. It is therefore desirable to include in the powder a buffering agent which is capable of imparting a pH to the reconstituted product between pH 3 and 7. The preferred buffering agent is citric acid. The amount of citric acid or other buffering agent which is necessary to provide the proper pH varies with the types and amounts of the other ingredients and the amount of water intended to be added for reconstitution, but is easily determined for each individual case beforehand by preparing a trial batch of the particular composition and adding the buffering agent until the correct amount is determined.

In addition to the therapeutic benefits attained from the kaolin and pectin it is advantageous if other therapeutic agents for the treatment of diarrhea are included. For example, neomycin and the relatively insoluble sulfonamides can be included in accordance with the teachings of U.S. Patent No. 2,828,242. When neomycin is added, methylcellulose is also included as disclosed in the cited patent.

In order to provide the dry powder composition of the present invention it is necessary that the powder be prepared by first suspending the bentonite and pectin in water in the presence of the alkyl polyalcohol and then drying.

The kaolin, bentonite, and pectin are reduced to a fine powder and dispersed in water with the alkyl polyalcohol to form a suspension. After the addition the suspension is stirred until all of the ingredients are hydrated. The suspension can be run through a colloid mill to further reduce the size of the dispersed particles, although this step is optional. Prior to drying, the pH of the suspension can be adjusted by addition of buffering agent.

The amount of water to be used for preparing the suspension is preferably that amount which will make a suspension equal in volume to the intended volume of the reconstituted product. For example, in the preferred form the composition is reconstituted to a 23% w./v. suspension as it is to be ingested, therefore in preparation a 23% w./v. suspension is prepared prior to drying. It is possible, in order to reduce the amount of drying necessary to prepare a more concentrated suspension by reducing the amount of water to ⅔ the amount of the finished product. On the other hand, less concentrated suspensions can be prepared, although they will increase the amount of drying necessary while not affording any advantage.

Using a spray dryer, the suspension is blown into the dryer using an inlet temperature of from 80 to 180° C. and an outlet temperature of from 50 to 100° C. After drying the powder is collected and packed in suitable containers.

For freeze drying the suspension can be placed in its packaging container, the container frozen, dried and sealed or the suspension can be frozen, dried and the freeze dry cake, screened and the powder filled into containers.

Advantageously the containers can be glass bottles of measured volume, and the powder filled in an amount calculated to give the correct concentration when the bottle is filled with water. Alternatively, the powder can be filled in packet form, to save space, each packet containing a predetermined amount of powder calculated to prepare a predetermined amount of suspension.

As an alternative to supplying the composition in dry powder form, the composition can be pressed into tablets.

In preparing a tablet, a binding agent is added to the formulation preferable at the time and in the manner in which the powder is made. That is to say, all ingredients are first suspended in water, dried, and then the powder mixture pressed into tablets. Suitable tablet binding agents include, for example, gelatin, agar, acacia, and the polyethylene glycol waxes. The binding agent can be used in a concentration of up to about 10% w./w. of the composition.

Example 1

A composition according to the present invention is prepared from the following types and amounts of ingredients:

| | |
|---|---|
| Kaolin kg | 374.0 |
| Bentonite kg | 37.3 |
| Pectin kg | 8.3 |
| Glycerin kg | 37.3 |
| Citric acid hydrate kg | 1.62 |
| Saccharin soluble kg | 0.348 |
| Flavor liter | 3.8 |
| Methylparaben kg | 3.8 |
| Deionized water q.s. ad 1892.5 liter. | |

The methylparaben, flavor, saccharin, citric acid and glycerin are dissolved in about 1400 liters of water. The kaolin, bentonite and pectin are mixed together and stirred into the water solution to form a suspension. The suspension is stirred until the colloids are hydrated and then sufficient water is added to make 1892.5 liters and the pH adjusted to pH 4.2.

The suspension is dried in a spray dryer using an inlet temperature of about 80–90° C. The dry powder is collected and filled into pint bottles, each bottle filled with 138 grams of dry powder.

In an alternative method for preparation the bentonite, pectin and glycerin are dispersed in sufficient water to make about 1900 liters, the pH adjusted to pH 4.2 and the suspension dried. The remaining ingredients can then be added to the dried powder to finish the composition.

At the time of use, each pint bottle is filled with water to make 16 ozs. and shaken for about a minute to reconstitute the composition.

The reconstituted product is useful for the treatment of diarrhea.

Example 2

The following Formulas A through F, inclusive, illustrate various proportions of dry ingredients for a formulation of 1000 gm. intended to be reconstituted to prepare 4 liters of suspension:

(A)

| | Gm. |
|---|---|
| Kaolin | 950 |
| Bentonite | 30 |
| Pectin | 1 |
| Glycerin | 20 |
| Deionized water q.s. ad 4000 ml. | |

(B)

| | |
|---|---|
| Kaolin | 670 |
| Bentonite | 30 |
| Pectin | 100 |
| Glycerin | 200 |
| Deionized water q.s. ad 4000 ml. | |

(C)

| | |
|---|---|
| Kaolin | 500 |
| Bentonite | 300 |
| Pectin | 1 |
| Glycerin | 200 |
| Deionized water q.s. ad 4000 ml. | |

(D)

| | |
|---|---|
| Kaolin | 650 |
| Bentonite | 150 |
| Pectin | 20 |
| Glycerin | 180 |
| Deionized water q.s. ad 4000 ml. | |

(E)

| | Gm. |
|---|---|
| Kaolin | 700 |
| Bentonite | 50 |
| Pectin | 50 |
| Glycerin | 200 |
| Deionized water q.s. ad 4000 ml. | |

(F)

| | |
|---|---|
| Kaolin | 770 |
| Bentonite | 75 |
| Pectin | 75 |
| Glycerin | 80 |
| Deionized water q.s. ad 4000 ml. | |

The glycerin is dissolved in 2500 ml. of water. The kaolin, bentonite and pectin are mixed together and stirred into the water solution to form a suspension. The suspension is stirred until the colloids are hydrated and then sufficient water is added to make 4 liters and the pH adjusted to pH 4.0.

The suspension is dried on a spray dryer using an inlet temperature of 140° C. and an outlet temperature of about 80–90° C. The dry powder is collected, about 1000 gm. and packaged in a suitable container. The dry powder is storage stable and not damaged by the temperatures of hot or cold climates and is reconstituted by the addition of sufficient water to make 4 liters.

As an alternative to spray drying, the suspension can be frozen and dried under vacuum. The freeze dry cake is screened and the dry powder is packaged as above.

Alternatively in each of the above formulas A through F, inclusive, the glycerine can be replaced by an equal weight of propylene glycol, erythritol, arabitol and sorbitol.

Example 3

A composition according to the present invention containing neomycin is prepared according to the following formulation of commercial scale.

FORMULA FOR 500 GALLONS (RECONSTITUTED)

| Ingredients | Gals. | Lbs. | Ozs. | Grs. |
|---|---|---|---|---|
| Methylparaben, USP | | 8 | 6 | |
| Saccharin soluble gran., USP | | | 13 | 143 |
| Citric acid powdered, USP | | 3 | 15 | |
| Polyoxyethylene sorbitan trioleate | | 2 | 1 | 167 |
| Deionized water | 320 | | | |
| Kaolin, N.F | | 822 | | |
| Pectin, N.F | | 18 | 4 | |
| Bentonite powder, USP | | 82 | 8 | |
| Glycerin | 8 | | | |
| Methylcellulose, N.F., 25 cps. micronized | | 83 | 10 | |
| Neomycin sulfate powder | | 45 | 12 | |
| Deionized water (add sufficient to make up desired amount) | 500 | | | |
| Citric acid powder, USP (to adjust pH) | | | | |

The methylparaben, saccharin, citric acid, glycerin and polyoxyethylene sorbitan trioleate are dissolved in approximately 320 gallons of deionized water. Kaolin, methylcellulose 25 cps. (centipoise units), pectin and bentonite are weighed into a mixer and mixed for 25 minutes. The kaolin-methylcellulose-pectin-bentonite mixture is added to the water solution at such a rate as to wet the powders in a one hour period. The whole is mixed thoroughly and enough deionized water is added to make up volume to 490 gallons. This is mixed for a minimum of fifteen hours. Neomycin sulfate is dissolved in five gallons of deionized water and added to the foregoing. Enough deionized water is added to make up volume to 500 gallons. The whole is mixed thoroughly. The pH is adjusted to between 4.0 and 4.7 with additional citric acid if required.

The 500 gallons is dried in a spray dryer using an inlet temperature of 400° F. and an outlet temperature of about 150–160° F. The dry powder is collected and filled into pint bottles. Each pint is filled with 5 oz. and 275 grains of dry powder.

As an alternative to spray drying the dry powder can be prepared by freeze drying. The 500 gallons of suspension prepared above is subdivided into 25 gallons sub lots, frozen and dried. The freeze dried cake is reduced by screening through a No. 027 screen and the dry powder filled into pint containers as above. Similarly, the product can be freeze dried by filling the 500 gallon suspension into pint bottles, freezing and drying in the pint container and then capping the containers.

Example 4

A composition according to the present invention is prepared from the following types and amounts of ingredients:

| | | |
|---|---|---|
| Kaolin | kg | 374.0 |
| Bentonite | kg | 37.3 |
| Pectin | kg | 8.3 |
| Glycerin | kg | 37.3 |
| Acacia | kg | 45.0 |
| Citric acid hydrate | kg | 1.62 |
| Saccharin soluble | kg | 0.348 |
| Flavor | liter | 3.8 |
| Methylparaben | kg | 3.8 |
| Deionized water q.s. ad 1892.5 liter. | | |

The methylparaben, flavor, saccharin, citric acid and glycerin are dissolved in about 1400 liters of water. The kaolin, bentonite, acacia, and pectin are mixed together and stirred into the water solution to form a suspension. The suspension is stirred until the colloids are hydrated and then sufficient water is added to make 1892.5 liters and the pH adjusted to pH 4.2.

The suspension is dried in a spray dryer using an inlet temperature of about 80–90° C. The dry powder is collected and pressed into tablets, each tablet weighing about 5 grams.

At the time of use the tablets are mixed with water, 2 tablets per ounce, to reconstitute the composition.

The reconstituted product is useful for the treatment of diarrhea.

Example 5

The following Formulas A through F, inclusive, illustrate various proportions of dry ingredients for a tablet formulation of 1000 gm., each 1000 grams of tablets intended to be reconstituted to prepare 4 liters of suspension:

(A)

| | Gm. |
|---|---|
| Kaolin | 940 |
| Bentonite | 30 |
| Pectin | 1 |
| Glycerin | 20 |
| Polyethylene glycol 6000 | 10 |
| Deionized water q.s. ad 4000 ml. | |

(B)

| | |
|---|---|
| Kaolin | 665 |
| Bentonite | 30 |
| Pectin | 100 |
| Glycerin | 200 |
| Polyethylene glycol 6000 | 5 |
| Deionized water q.s. ad 4000 ml. | |

(C)

| | Gm. |
|---|---|
| Kaolin | 492 |
| Bentonite | 300 |
| Pectin | 1 |
| Glycerin | 200 |
| Polyethylene glycol 6000 | 8 |
| Deionized water q.s. ad 4000 ml. | |

(D)

| | |
|---|---|
| Kaolin | 640 |
| Bentonite | 150 |
| Pectin | 20 |
| Glycerin | 180 |
| Polyethylene glycol 6000 | 10 |
| Deionized water q.s. ad 4000 ml. | |

(E)

| | |
|---|---|
| Kaolin | 690 |
| Bentonite | 50 |
| Pectin | 50 |
| Glycerin | 200 |
| Polyethylene glycol 6000 | 10 |
| Deionized water q.s. ad 4000 ml. | |

(F)

| | |
|---|---|
| Kaolin | 665 |
| Bentonite | 75 |
| Pectin | 75 |
| Glycerin | 80 |
| Polyethylene glycol 6000 | 5 |
| Deionized water q.s. ad 4000 ml. | |

The glycerin is dissolved in 2500 ml. of water. The kaolin, bentonite, pectin and polyethylene glycol 6000 are mixed together and stirred into the water solution to form a suspension. The suspension is stirred until the colloids are hydrated and then sufficient water is added to make 4 liters and the pH adjusted to pH 4.0.

The suspension is dried on a spray dryer using an inlet temperature of 140° C. and an outlet temperature of about 80–90° C. The dry powder is collected, and pressed into tablets. The tablets are storage stable and not damaged by the temperatures of hot or cold climates and is reconstituted by the addition of sufficient water to make 4 liters.

As an alternative to spray drying, the suspension can be frozen and dried under vacuum. The freeze dry cake is screened and the dry powder pressed into tablets as above.

Alternatively in each of the above formulas A through

F, inclusive, the glycerin can be replaced by an equal weight of propylene glycol, erythritol, arabitol and sobitol.

Alternatively, in each of the above formulas A through F, inclusive, the polyethylene glycol 6000 can be replaced by an equal weight of acacia, tragacanth, agar, and gelatin.

What is claimed is:

1. A process for preparing a dry powder mixture suitable for reconstitution by the addition of water comprising the dispersing of kaolin, bentonite, pectin, and an alkyl polyalcohol having from 3 to 6 carbon atoms, inclusive, in water to form a suspension wherein said dispersed ingredients have a concentration of up to 45% w./v. of said suspension and the concentration of said dispersed ingredients relative to each other are from about 50 to about 95% w./w. of kaolin, from about 3 to about 30% w./w. of bentonite, from about 0.1 to about 10% w./w. of pectin and from about 2 to about 20% w./w. of an alkyl polyalcohol having from 3 to 6 carbon atoms, inclusive, and removing the water from said suspension by means of a drying process.

2. The process of claim 1 wherein the water is removed from the suspension by spray drying.

3. The process of claim 1 wherein the water is removed from the suspension by freeze drying.

4. A dry powder mixture suitable for reconstitution by the addition of water comprising from about 50 to about 95% w./w. of kaolin, from about 3 to about 30% w./w. of bentonite, from about 0.1 to about 10% w./w. of pectin and from about 2 to about 20% w./w. of an alkyl polyalcohol having from 3 to 6 carbon atoms, inclusive, prepared by the process of claim 1.

5. A process for preparing a dry powder mixture suitable for reconstitution by the addition of water comprising the dispersing of bentonite, pectin and an alkyl polyalcohol having from 3 to 6 carbon atoms, inclusive, in water to form a suspension, wherein said dispersed ingredients have a concentration of up to 45% of said suspension, removing the water from said suspension by means of a drying process to form a dry powder, and mixing kaolin into the said powder, wherein the concentration of the said ingredients relative to each other are from about 50 to about 95% w./w. of kaolin, from about 3 to about 30% w./w. of bentonite, from about 0.1 to about 10% w./w. of pectin and from about 2 to about 20% w./w. of an alkyl polyalcohol having from 3 to 6 carbon atoms, inclusive.

6. The process of claim 5 wherein the pectin and bentonite are suspended separately in water and alkyl polyalcohol, dried, and mixed together.

References Cited

UNITED STATES PATENTS

| | | | |
|---|---|---|---|
| 2,650,895 | 9/1953 | Wallenmeyer | 167—81 |
| 2,832,716 | 4/1958 | Cassil | 167—42 |

OTHER REFERENCES

U.S. Dispensatory, 25th edition, 1955, Lippincott Co., Phliadelphia, Pa., pp. 148 and 736.

FRANK CACCIAPAGLIA, JR., *Primary Examiner.*

U.S. Cl. X.R.

424—180, 343, 357.